US009804688B2

(12) United States Patent
Chang

(10) Patent No.: US 9,804,688 B2
(45) Date of Patent: Oct. 31, 2017

(54) LIGHT TRACING METHOD AND APPARATUS THEREOF

(71) Applicants: Yun-Shan Chang, San Jose, CA (US); Da Wei Lin, New Taipei (TW)

(72) Inventor: Yun-Shan Chang, San Jose, CA (US)

(73) Assignees: Yun-Shan Chang, San Jose, CA (US); Da-Wei Lin, New Taipei (TW)

( * ) Notice: Subject to any disclaimer, the term of this patent is extended or adjusted under 35 U.S.C. 154(b) by 0 days.

(21) Appl. No.: 14/036,245

(22) Filed: Sep. 25, 2013

(65) Prior Publication Data

US 2015/0085299 A1   Mar. 26, 2015

(51) Int. Cl.
*G01P 3/36* (2006.01)
*G06F 3/03* (2006.01)
*G01D 5/347* (2006.01)

(52) U.S. Cl.
CPC .......... *G06F 3/0304* (2013.01); *G06F 3/0317* (2013.01); *G01D 5/347* (2013.01)

(58) Field of Classification Search
CPC ...................................................... G01D 5/347
See application file for complete search history.

(56) References Cited

U.S. PATENT DOCUMENTS 6,160,901 A * 12/2000 Kage ............................ 382/107
8,405,613 B2   3/2013 Bieber et al.
8,913,251 B2 * 12/2014 Tin ................................ 356/600
2007/0109272 A1 * 5/2007 Orsley et al. .................. 345/173
2008/0158158 A1 * 7/2008 Cheah et al. .................. 345/166
2009/0179656 A1 * 7/2009 Mueller et al. ............... 324/751
2013/0241835 A1 * 9/2013 Lee ................................ 345/166

OTHER PUBLICATIONS

Communication From the Taiwan Patent Office Regarding a Counterpart Foreign Application Dated (Taiwan Year 104) Jan. 14, 2015.

\* cited by examiner

*Primary Examiner* — Kara E Geisel
*Assistant Examiner* — Hina F Ayub
(74) *Attorney, Agent, or Firm* — Rosenberg, Klein & Lee

(57) ABSTRACT

Disclosure is related to a light tracing method, and an apparatus thereof. According to one embodiment of the invention, the apparatus is such as an optical indexer. The method for determining a moving direction is performed based on an optical constructive or destructive interference pattern made by reflected lights received by a sensor chip. In particular, the coherent light may be preferably used in order to enhance the interference effect. In an exemplary embodiment, the method includes firstly the sensor pixels in the sensor chip receiving the reflected light, and calculating the energy. Next, within a time slot, the energy state of each sensor pixel can be calculated. A moving vector may be determined from a difference between the binary energy states of the adjacent sensor pixels. The binary energy state is based on a comparison between every sensor pixel and a statistic average within the sampling time slot.

9 Claims, 6 Drawing Sheets

LIGHT TRACING METHOD AND APPARATUS THEREOF

BACKGROUND

1. Technical Field

The present invention is generally related to a light tracing method and an apparatus, in particular, provided is an optical indexer that determines moving track by incorporating a coherent light interference pattern with a binary imaging method.

2. Description of Related Art

The conventional optical computer mouse is referred to FIG. 1 that depicts inner circuits. This optical mouse 10 moves over a surface 11. Within its device housing 12, the inner circuits include a circuit board 14 in addition to the essential optics elements. Further, a controller 18 used to control, sense and operate light emission, a light source 16, and a sensor 19 are disposed on the circuit board 14.

According to the present example of the optical mouse 10, an aperture 17 directed to external surface 11 is formed on its housing 12. The circuit board 14 is disposed near the aperture 17. A light source 16 such as a laser die or LED is disposed onto the circuit board 14. The light source 16 continuously emits lights to the surface 11 with a specific angle while the optical mouse 10 operates. The shown broken line represents the path of the incident light. A sensor 19 receives reflected light from the surface 11. The sensor 19, such as a CMOS or CCD image sensor, may obtain a distribution diagram made by the reflected light. The controller 18 then obtains a moving direction of the optical mouse 10 by analyzing the energy distribution.

In the conventional technology that determines the moving track of the optical mouse 10, the surface 11 may dominate the performance of tracking the optical mouse 10 since the signals of reflected light made by the surface 11 is the essential information.

For example, the conventional optical mouse 10 may not normally operate when it moves over a transparent material or the surface (11) that hard to reflect the light. Further, the optical mouse 10 may not easily work when it moves over an undulate non-planar surface 11, for example the cloth with wrinkles.

In the conventional technologies, some of them use additional positioning measures to acquire the moving tracks, or some use additional complicated algorithm to maintain a certain ability of tracing the movement. However, theses positioning measures or algorithm may be limited to some types of surfaces because of the limitations of sensitivity, high energy consumption, and complexity. However, these technologies are not applicable to or achieve light tracing over every surface with too high or too low reflectivity.

SUMMARY

In view that the conventional optical mouse is not applicable to the surface with too high or too low reflectivity, disclosed is a light tracing method and apparatus that adopts the light source such as laser that is with good spatial coherence. The related method incorporates the pattern of constructive or destructive interference between reflected light and original incident light to be the reference for recognizing the tracks.

In one of the embodiments of disclosure, the light tracing method includes employing a sensor to receive a reflected light from a surface. Exemplarily, the sensor is such as a sensor array including a plurality of sensor pixels arranged in an array. The light may be generated by a laser device. The sensor array then receives the reflected light from the surface.

In a preferred embodiment, the light source is a device used to generate the light with good spatial coherence. The light received by the every sensor pixel within a period of a sampling time can be obtained. The method is then to calculate the energy received by the every sensor pixel of the sensor chip, and to calculate energy states of all or part of the sensor pixels within the period of sampling time. After that, a change of the energy states between the sensor pixels in the sensor chip, for example the adjacent two sensor pixels, within the sampling time can be obtained. Therefore, a moving vector is determined. After repeating the steps in the light tracing method, the many moving vectors within multiple sampling times are obtained so as to determine a moving track.

In the step of calculating energy states of all or part of the sensor pixels within a period of a sampling time, at least two differences between the energy received by the every sensor pixel and at least two statistic averages are obtained, and the difference at different times is used to determine a moving vector. The difference is expressed as the energy state. It is noted that the statistic average is calculated from the energies of the sensor pixels in a row, column or any geometric direction within the sampling time.

According to one of the embodiments, the sampling time is exemplarily set between a first time and a second time. In the step of calculating the change of energies of at least two adjacent sensor pixels within a sampling time, the energy state of the every sensor pixel at the first time is firstly obtained, and the energy state at the second time is also obtained. Then the change of the energy states at the first and second time of the adjacent sensor pixels is obtained. The moving vector is therefore calculated.

In one further embodiment, a light tracing apparatus using the above method of light tracing includes a light source used to generate a light emitted to a surface; and a sensor chip having a plurality of sensor pixels arranged in an array, and a circuit-integrated controller. The controller is coupled to the light source and the sensor array. The controller is used to obtain the light signals received by the sensor pixels in the sensor chip. The energy state of every pixel and change of energy states within the sampling time may also be obtained.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
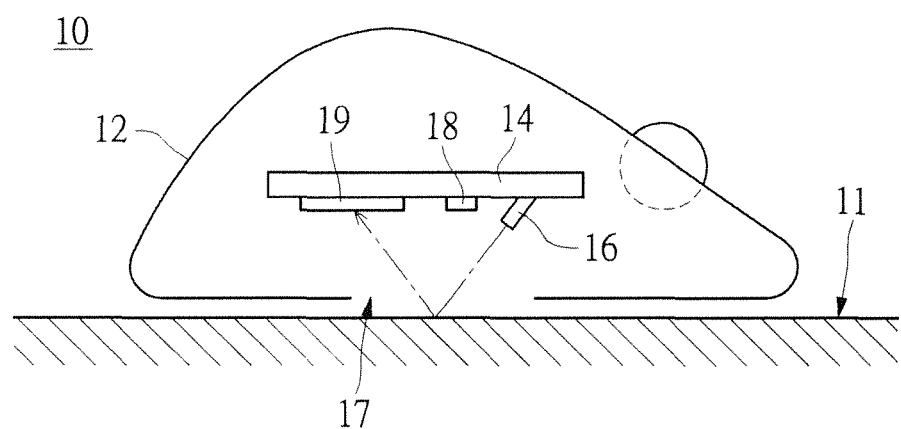
FIG. 1 shows the inner circuits of the conventional optical mouse.

Reference will now be made in detail to the exemplary embodiments of the present disclosure, examples of which are illustrated in the accompanying drawings. Wherever possible, the same reference numbers are used in the drawings and the description to refer to the same or like parts.

The conventional technology adopting non-coherent light to determine movement usually requires a complicated data processing process, for example determining computer mouse's moving tracks. The technologies to make this determination are usually restricted to some limited surfaces, for example the surface with too low reflectivity should be avoided. In view of the drawbacks of the conventional technologies, disclosure herein is provided with a light tracing method and apparatus.

In one embodiment, a coherent light or said the light with great spatial coherence is preferably applied. The coherent light allows the determination of the moving tracks to be more efficient. The determination may be cooperated with a scheme of sensitivity compensation that employs a movement recognition algorithm for light tracing. By which, the light tracing method can be applied to the various type of surfaces.

It is worth noting that a scheme of coherent light source package integration is introduced to the related light tracing apparatus according to one embodiment of the disclosed invention. The apparatus such as an optical indexer needs not to mount any additional optical lens or specific image sensor, for example the CMOS image sensor (CIS).

Figure 2:
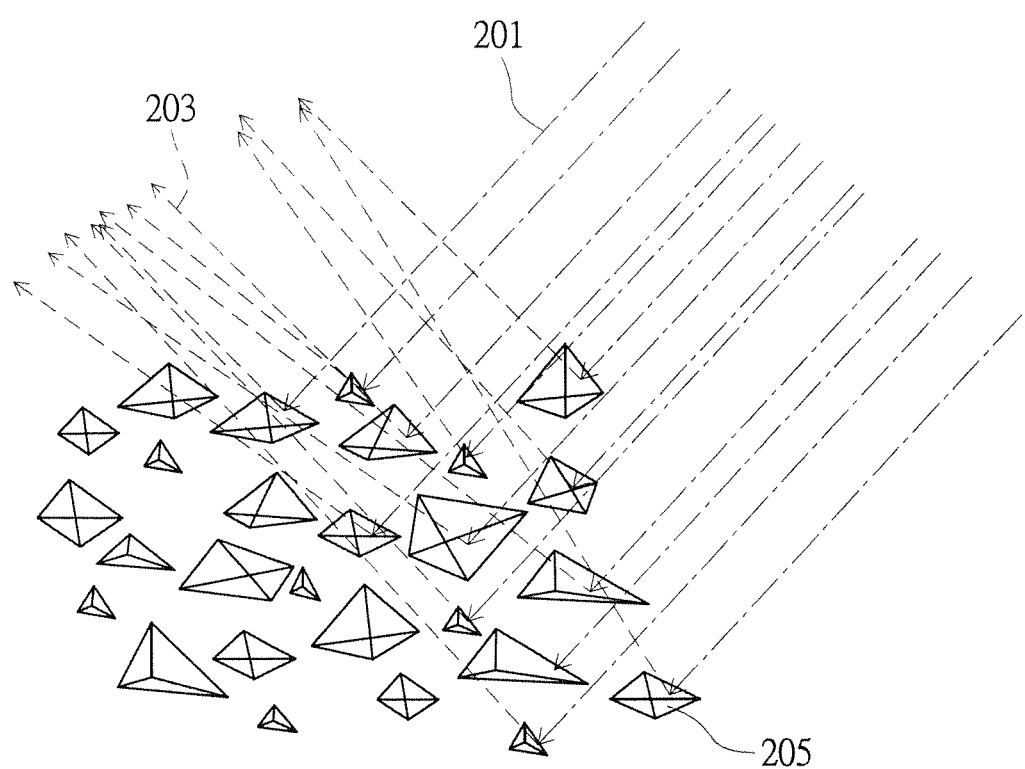
FIG. 2 shows a schematic diagram of an incident plane and the reflected light paths.

Reference is made to FIG. 2 depicting an incident light (20) made by a specific light source (not shown) emitted to a surface and then reflected (203). Therefore multiple reflected light paths expressed by the multiple lines are generated. The light source may utilize Laser, the coherent light. It is noted that the described coherent light may also be the light with great spatial coherence.

The shown multiple light paths involving the paths indicative of incident lights 201 emitted to a surface with surface structure 205, and the paths for reflected lights 203. Within a microscopic view of field, the surface structure 205 has irregular structure that causes the multi-directional reflected lights 203 as shown in the diagram.

The light source may continuously generate the incident lights 201 to the surface, and form the reflected lights 203. The reflected lights 203 are received by the sensor (not shown), in which the lights form the optical constructive and destructive interference patterns. It is particular that the light source is a coherent light source that generates the coherent incident light allowing enhancing the interference effect.

When the apparatus installed with the circuits embodying the mentioned light tracing method moves over an X-Y plane, the photo sensor receives the reflected lights 203. The apparatus samples the signals within a period of sampling time, and calculates average energy of the reflected lights. After that, an energy difference in different times or at different positions may be obtained. The light tracing apparatus according to the disclosure may preferably incorporate a sensor array that is used to obtain the energies at the different positions, and difference between the average energies. The moving track may therefore be determined. The calculation of the statistic average may include acquiring a statistic average from the energies received by all the sensor pixels; or the average is made by part of the sensor pixels. For example, the average is referred to the sensor pixels over a row such as the X direction shown in FIG. 5; or over a column such as the Y direction. The energy average may also be calculated from the energies received by the surrounding sensor pixels or centered pixels within a specific area.

In one of the embodiments incorporating the sensor array, the interference effect may be enhanced while the light source generates coherent light. It is noted that the coherent light introduces a very small phase delay within a wave envelope. The Laser is one type of the coherent lights rather than the non-coherent light such as sunlight or LED light.

To improve sensitivity of the optical sensor under the interface made by the reflected light, the coherent light is preferably introduced to the light tracing apparatus of the present invention. The coherent light may cause much small phase delay since it is featured to have less phase difference. To the spatial interface made by the non-coherent reflected light, the coherent light may cause comparative small phase delay. The coherent light may therefore advantage the spatial interference effect of the reflected light. The above-mentioned sensor array may calculate the difference of the spatial interface by the lights reflected from a surface.

Figure 3:
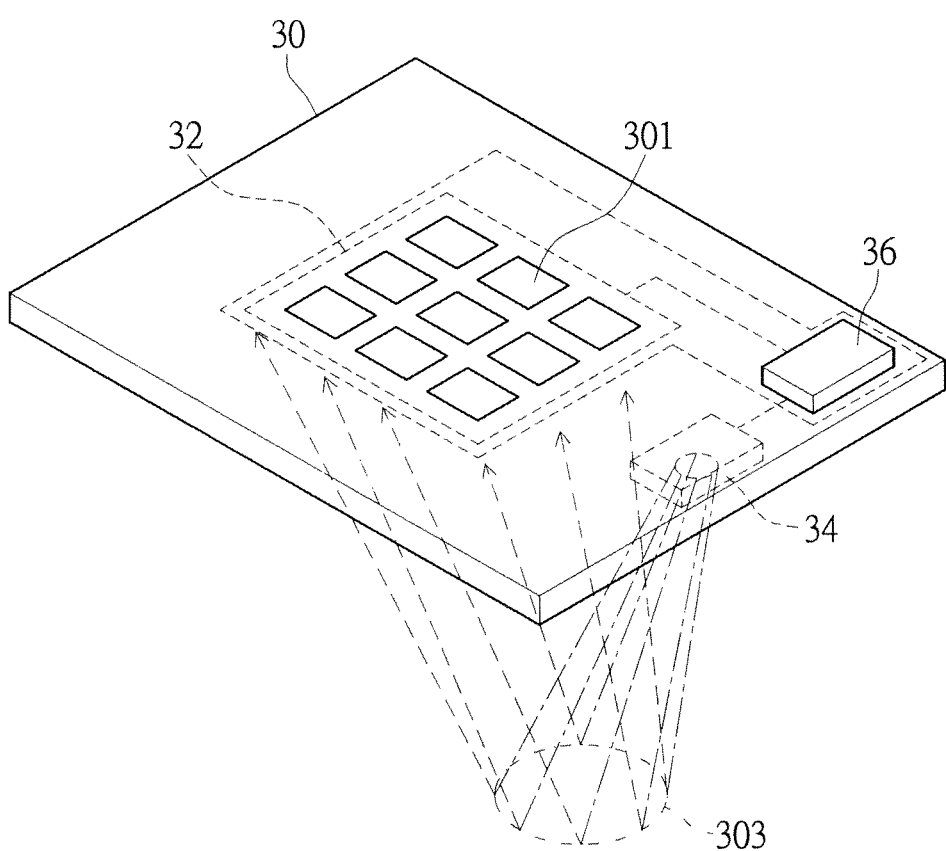
FIG. 3 shows a schematic diagram of a sensor array packaged in one integrated circuit of the light tracing apparatus in one embodiment of the present invention.

The sensor array is such as the sensors shown in FIG. 3 describing the light tracing packaged into one IC. According to one of the embodiments, the sensor array and the related controlling circuits are integrated into one semiconductor circuit. The mentioned light source, sensor array, and the controller may be packaged onto a circuit board within the light tracing apparatus. Therefore, there is no need to install any optical sampling element such as lens or specific semiconductor process such as CIS so as to advance photosensitive sensitivity.

A circuit board 30 shown in the figure is installed in one apparatus such as an optical computer mouse or a specific indexer. A sensor array 32 is mounted onto the circuit board 30. The sensor array 32 includes a plurality of sensor pixels 301 arranged in an array. The sensor pixels 301 are integrated into an IC. In particular, the sensor array 32 and the controller 36 are integrated. The sensor pixels 301 of the sensor array 32 may evenly receive the reflected lights from their fixed positions. A light source 34 schematically emits lights onto a surface and forms the shown illuminated area 303. The lights reflected from the surface may then emit the sensor array 32. The every sensor pixel 301 receives the reflected light from different directions. A suitable photoelectric signal conversion may be applied to the signals received by the sensor pixels 301. The controller 36 and related circuit are used to measure the statistic average of the energy by firstly summing up the energies received by the sensor pixels 301. Next, the difference of the statistic average and the energy received by the every sensor pixel 301 can be obtained. The spatial interference difference made by the lights reflected from the surface can be obtained. The controller 36 may therefore determine the moving direction by accumulating multiple energy differences within a period of a sampling time.

About the spatial interface in the mentioned light tracing apparatus, especially, but not limited to, the coherent light source emits lights to the irregular surface structure of the surface and then generates the reflected lights with different directions. The optical interference is therefore produced. Interaction made between the incident lights and the reflected lights produces constructive or destructive interference patterns. The sensor array may acquire the spatial information from the interference patterns since the apparatus moves relative to the surface. The information associated to the movement over X-Y plane is therefore established.

In one embodiment, a Laser device may be introduced to be the light source of the light tracing apparatus, the optical indexer. In a circuit board (30), the essential elements of the apparatus include a light source (34) that is sued to generate an incident light emitted to a surface; a sensor array (32) including multiple sensor pixels (301) arranged in an array; a controller (36) coupled to the light source (34) and the sensor array (32), used to receive the light signals received by the sensor pixels (301). The energy state of every sensor pixel and the difference of the energy states within the period of sampling time can be acquired.

Figure 4:
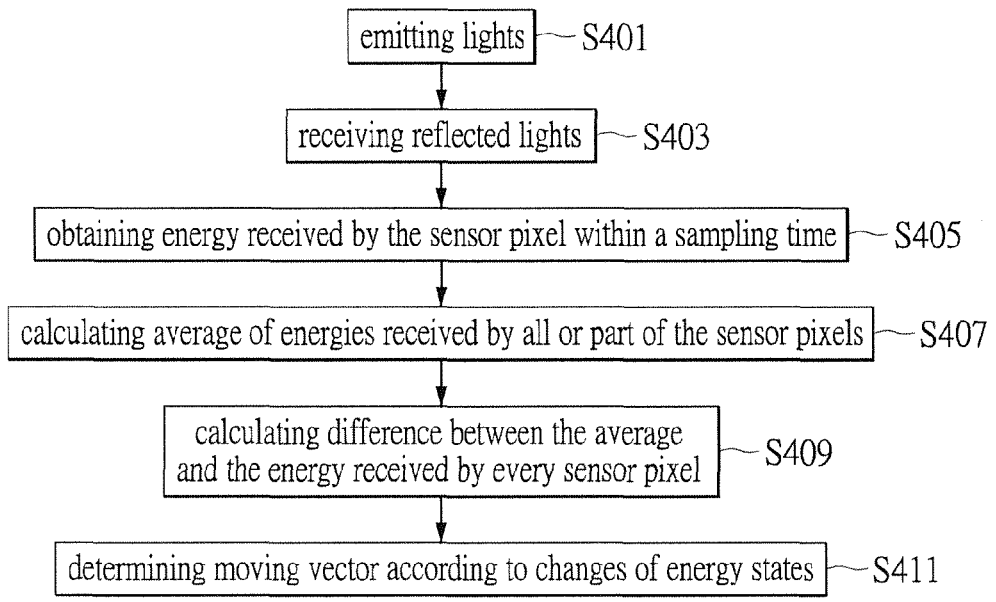
FIG. 4 shows a flow illustrating the steps of light tracing in one embodiment of the present invention.

Reference is made to FIG. 4 showing a flow chart to illustrate the light tracing method in one embodiment of the present invention.

In the beginning, such as the step S401, a light source of the light tracing apparatus emits the light to a surface. After that, such as step S403, the sensor of apparatus receives the reflected lights.

According to one of the embodiments, the light source is preferably a coherent light. One of the objectives of adoption of the coherent light is to improve sensitivity of detecting the moving direction by the optical interference made by the reflected lights. Since the coherent light is featured to have smaller phase delay, the sensitivity can therefore be improved. It is noted that the light source is exemplarily a Laser device; and the sensor is preferably the sensor array described in FIG. 3.

In the light tracing method, the energy states of all or part of the sensor pixels within the period of sampling time can be obtained. Further, the change of the energy states of the at least two adjacent sensor pixels can be calculated. The change of energy states may be used to determine a moving vector.

While the sensor receives the reflected lights, such as step S405, the control circuit in the apparatus may calculate the energy received by the every sensor pixel within the sampling time. In step S407, an energy average may be calculated from the energies received by all or part of the sensor pixels within the period of sampling time. It is noted that, such as the example described in FIG. 6, not all the sensor pixels receive sufficient energies of the lights. It is also noted that at least two values may be processed at the same time. The energy average, calculated from all or part of the sensor pixels, is such as a row average, a column average, a surrounding average, or a center average. A difference between the energy received by the every sensor pixel and the energy average may be obtained. This difference represents an energy state of the sensor pixel at the moment. In step S409, at least two differences within the period of sampling time may be obtained. A difference between the two energy states shows the energy change within the sampling time. The energy changes calculated from the at least two adjacent sensor pixels in the sensor chip are used to determine an overall moving vector of the apparatus that adopts the light tracing method (step S411).

Figure 6:
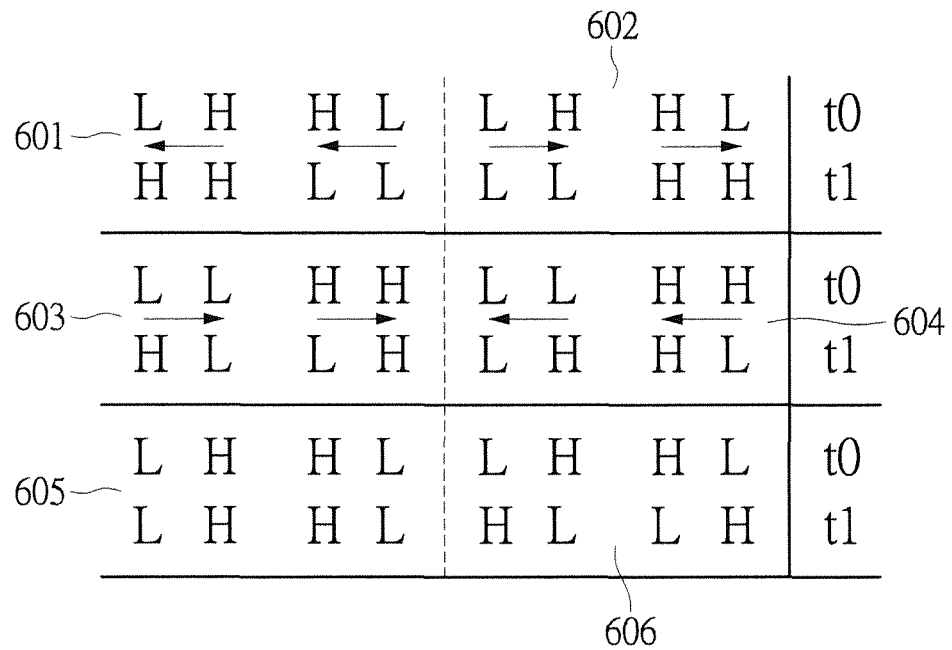
FIG. 6 shows an exemplary diagram describing the method of light tracing in the sensor pixels in one embodiment of the present invention.
Figure 7:
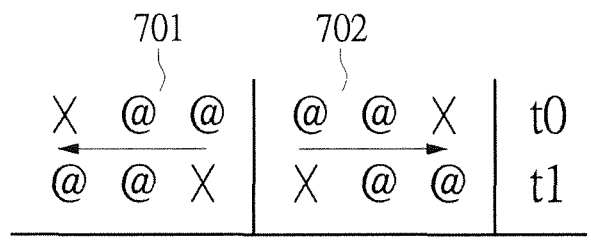
FIG. 7 shows an exemplary diagram describing the method of light tracing in the sensor pixels in another embodiment of the present invention.
Figure 8:
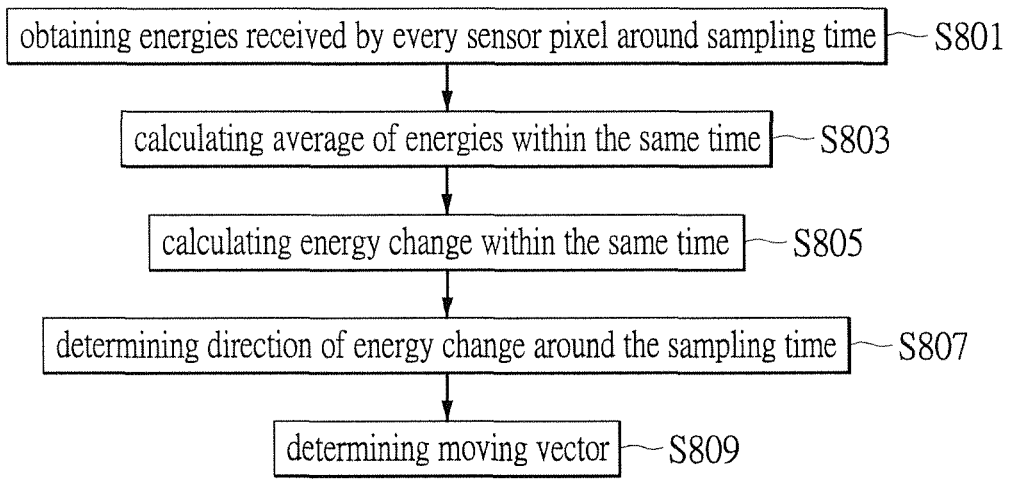
FIG. 8 shows a flow illustrating the steps of determining moving vector according to the directions of energy changes in the method of the present invention.

While repeating the steps in the light tracing method, the many moving vectors at different sampling time can be calculated. A moving track may therefore be determined within a period of time. The examples shown in FIGS. 6, 7 are exemplarily used to describe the method of determining the relative movement based on the every pixel's energy change. FIG. 8 then depicts the flow thereof.

Figure 5:
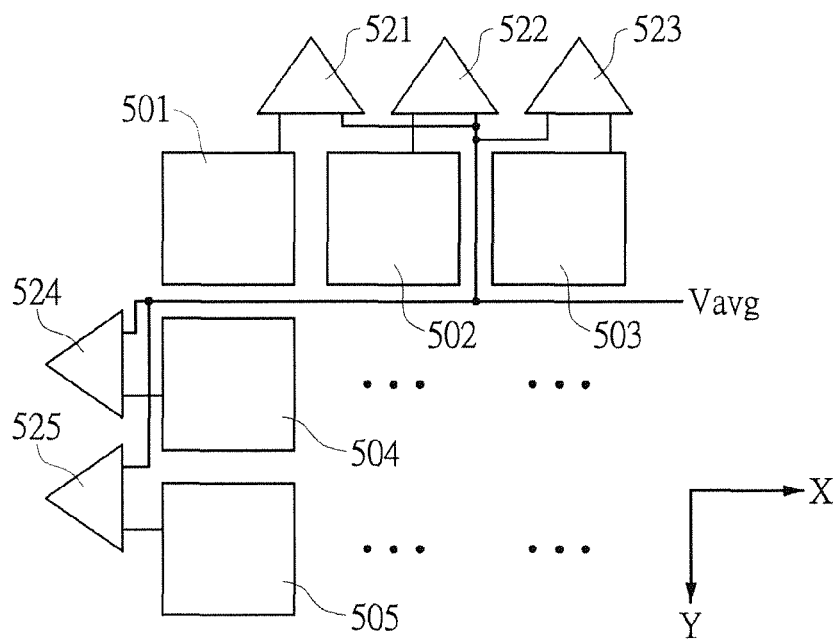
FIG. 5 shows a schematic diagram of the sensor array adopted by the light tracing apparatus in one embodiment of the present invention.

Reference is now made to FIG. 5 describing calculating a distribution of the energies received by the sensor array of the light tracing apparatus. The algorithm made to the light tracing method may be performed through the circuits and the sensor array in the apparatus of the present invention.

Further, FIG. 5 schematically shows a layout of the sensor array. A plurality of sensor pixels are arranged over an X-Y plane. An "N×M" sensor array is formed. The sensor pixels 501, 502, 503, 504, and 505 are arranged in an array respectively along X and Y directions. It is noted that the practical number of the pixels is not limited to the figure. The circuit board with these sensor pixels 501, 502, 503, 504, and 505 further includes other elements such as the comparators 521, 522, 523, 524, and 525. The every comparator correspondingly associates with a sensor pixel. The input value is the average voltage signal Vavg generated by the every sensor pixel. This average voltage signal Vavg is compared with voltage signal generated by the sensor pixel as receiving the light. The comparison results in the high or low voltage value. At last, it is featured to determine the moving direction by acquiring the comparisons of the two adjacent sensors in the tracing method.

In the diagram, the shown comparator 521 is coupled to the sensor pixel 501. An input signal is such as the energy signal generated by the sensor pixel 501. The signal may be indicated by a voltage signal. The other input end shows an average voltage signal Vavg. The comparator 521 is used to compare the two inputs, and output a comparison result. In one embodiment, a binary characteristic value (H/L) is used to indicate this comparison result. The high and low voltage signals are respectively expressed by the characters H and L that as shown in FIG. 6.

According to one of the embodiments, the light tracing method is featured that an energy distribution over a plane is formed by depicting the constructive and destructive interference patterns of the reflected coherent lights. The change of the energy distribution at different times may be used to determine a moving vector. In an exemplary embodiment, a scheme of non-relative viewpoints is introduced to performing movement judgment. The scheme incorporates the energy information of the surrounding sensor pixels of the sensor chip to be compared with the average energy, so as to determine a moving direction. It is noted that, rather than the general method for determining the moving vector by the information extracted from the sensor pixels.

In particular, the method in accordance with the present invention employs the change of both the time and the energy to determine the movement. The energy change may be expressed by a binary energy state such as the mentioned labels "H" and "L". The binary energy state reflects the comparison made between the value read from the every sensor pixel and the statistic average.

Reference is made to FIG. 8 describing the steps of determining moving direction by referring to the energy changes at different times.

In step S801, the apparatus firstly obtains the energies received by the multiple sensor pixels within a time interval between time t0 and t1. A statistic average is then obtained by averaging the energies received by all or part of the sensor pixels within the interval (step S803). The energy value obtained from the every sensor pixel may be expressed by voltage signal. The energy change may be obtained by calculating the difference between the energy value and the average (step S805).

After that, the energy change between the adjacent sensor pixels at different times (t0, t1) is referred to determine the direction made by the energy change, such as step S807. At last, in step S809, an overall moving vector for the apparatus is therefore obtained by referring to the energy change.

Further, the voltage-based energy change made to the sensor pixel within the time interval indicates an energy state of the sensor pixel. The mentioned binary energy state "H" or "L" is introduced to expressing the energy state of the every sensor pixel as comparing the instant energy with the energy average.

By this scheme, the energy states of the every sensor pixel of the sensor chip respectively at a first time (t0) and a second time (t1) can be determined. The change of the energy states of the at least adjacent sensor pixels at the first time and the second time can be obtained. This change of the energy states within the time interval is used to determine the moving vector.

The determination of the moving vector made by the binary characteristic value (H/L) may be referred to the light tracing method exemplarily described in FIG. 6.

The exemplary diagram shows a plurality of sensor pixel groups 601, 602, 603, 604, 605, and 606 arranged in an array. It schematically shows the energy change between the adjacent sensor pixels at different times, e.g. first time t0 and second time t1. The energy change is used to determine the moving vector.

In FIG. 6, the time labels "t0" and "t1" represent the two sampling times. The labels and "L" respectively represent the high and low voltage signals outputted by the comparator. The labels and indicate the two types of energy states since two energies at two moments are compared with an average. This energy state indicated of an energy change may be expressed by the binary characteristic value (H/L). The voltage signals at the different times show a transition of the movement so as to determine the overall moving vector.

For example, a sensor pixel group 601 includes several sensor pixels at different energy states. It is shown at the left side of the diagram that the two sensor pixels are in different states at the first time t0, and exemplarily the sensor pixels respectively senses two states "L" and "H" (from left to right). The energy states "L,H" at the first time t0 are then transformed to the energy states "H,H" at the second time t1. It means the energy states of the two sensor pixels are transformed to the states "H,H" at the next moment. In which, it is determined that the energy state "L(t0)" of one of the sensor pixels is transformed to state "H(t1)", and it appears that the energy state "H" at the right position shifts to left position at the next moment. Therefore, in accordance with the present invention, it determines that the effective moving direction is from right to left within this sampling time.

Further, the energy states of another pair of sensor pixels in this sensor pixel group 601 are "H,L" at the first time t0; Next, at the second time t1, the energy states are transformed to next states "L,L". In which, the energy state of one of the sensor pixels is from state "H" to state "L". It appears that the energy state at the right position shifts to left position. It therefore shows the effective moving direction is from right to left.

Next, within the sensor pixel group 602, the energy states "L,H" of the left two sensor pixels at the first time t0 are transformed to states "L,L" at the second time t1. It shows the energy state "H" at the right position is replaced by the state "L" originally at left position. It therefore determined that the moving vector indicative of a direction from left to right.

Similarly, the energy states of the right two sensor pixels in the sensor pixel group 602 are "H,L" at the first time t0. At the second time t1, the energy states are transformed to next states "H,H". It shows the state "L" at the right position is replaced with the state "H" at the left position. It also determines that the moving vector indicative of the direction from left to right.

Further, there is no any arrow shown for the sensor pixel groups 605 and 606 after the determination shows there is no energy change therein. In which, the energy states for the sensor pixels are not changed from the first time t0 to the second time t1; or the change may not be qualified to determine any movement. For example, it is not able to determine the moving direction by this change since the energy states of the pixels in the sensor pixel group 606 are "L,H" at the first time t0, and be transformed to "H,L" at the second time t1. Therefore, the sensor pixel group 606 does not output any effective signal.

It consequently determines an overall moving vector by integrating all the obtained moving vectors when all the energy changes of all the sensor pixels are completely determined within the period of sampling time.

One further embodiment for determining the movement may be referred to FIG. 7. FIG. 7 shows a schematic diagram depicting the method of light tracing.

The shown aspect for recognizing the moving vector is based on the transformation of the energy states of the sensor pixels at different times. The label "X" indicates meaningless value; and label "@" shows the available sensing signal be found between the times t0 and t1. The aspect utilizes the change among the labels to determine the moving vector.

The signal energies received by the multiple sensor pixels in the sensor chip can be compared with an average at the different times while the sensor chip receives the reflected light. The comparison results in high or low voltage signal. For example, the label "@" shown in the diagram represents the available voltage signal. In some conditions, it is labeled as "X" when no energy change or no meaningful voltage signal fluctuation can be found.

In the embodiment shown in FIG. 7, in the sensor pixel group 701, the label "x@@" shows the comparator found the energy change among the adjacent sensor pixels at the first time t0. At the second time t1, the energy change made to the sensor pixels are labeled as "@@X". When the energy state "X@@" at the first time t0 are transformed to the state "@@X" at the second time t1, it appears that the label "@@" are shifted to left position. It is therefore a leftward shift in the sensor pixel group 701 determined, as the arrow shows in the diagram.

Further, in the sensor pixel group 702, the energy state of the adjacent sensor pixels is "@@X" showing the energy change occurred at the first time t0; and the energy state is "X@@" at the second time t1. The transformation is made between the times t0 and t1, and it shows the label "@@" is rightward shifted. The method of light tracing may therefore adopt this scheme to determine the overall movement within a period of time.

It is worth noting that any tiny error made to the sensor array incorporated in the apparatus of the present invention may not influence correct determination of the movement. When the light tracing method is applied to an optical computer mouse, the slow change of the reference signals may not influence the overall determination because the shifting rate as manipulating the mouse is far lower than the processing rate of the control circuit within the apparatus.

To sum up the above description, disclosure is related to the light tracing method and the apparatus using the method based on the optical interference made by the reflected lights. A coherent light is particularly utilized to form the interference patterns. The binary imaging samples are used to determine the moving track. Furthermore, the related apparatus using the method may be integrated into one semiconductor package. The method may effectively constrain the intrinsic nose within the circuits of the apparatus. The coherent light employed as the light source may effectively improve the sensitivity of the optical sensor for the reflected lights.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A light tracing method, comprising:
   a sensor chip, disposed in an optical indexer, receiving a reflected light by a surface, wherein the sensor chip includes a plurality of sensor pixels arranged in an array; wherein the reflected light is made by a coherent light with good spatial coherence generated by a light source emitted to the surface;
   calculating an energy of light received by every sensor pixel within a period of a sampling time;
   calculating a statistical average by averaging the energies received by all or part of the sensor pixels;
   calculating a difference between the energy received by the every sensor pixel and the statistical average, further an energy state of the sensor pixel is defined according to the energy difference and there are two types of energy states represented by binary characteristic values, in which change of the energy states for the sensor pixels in the array within the period of the sampling time shows a transition of a movement of the optical indexer;
   obtaining the energy states of all or part of the sensor pixels within the period of the sampling time; and
   determining a moving vector for the optical indexer according to the change of the energy states of at least two adjacent sensor pixels of the sensor chip within the period of the sampling time.

2. The method according to claim 1, wherein the light source is a laser device.

3. The method according to claim 2, wherein the sensor chip used to receive the reflected light is a sensor array including the plurality of sensor pixels arranged in the array.

4. The method according to claim 3, wherein a moving track is determined by repeating the steps of calculating moving vectors within the period of sampling time.

5. The method according to claim 1, wherein the sampling time is formed between a first time and a second time and the energy state of the sensor pixel indicates the difference between the energy received by every sensor pixel and the statistical average at the first time or the second time.

6. The method according to claim 5, wherein the step of calculating the change of energy states of at least two adjacent sensor pixels includes:
   determining the energy state of every sensor pixel at the first time;
   determining the energy state of every sensor pixel at the second time; and
   obtaining change of the energy states of at least two adjacent sensor pixels from the first time to the second time, so as to determine the moving vector;
   wherein, the energy state is expressed by a binary energy state.

7. A light tracing apparatus which adopts the light tracing method according to claim 1, comprising:
   a light source, used to generate a light emitted to the surface;
   a sensor array, including the plurality of sensor pixels arranged in an array; and
   a controller, coupled to the light source and the sensor array, used to obtain light signals received by the plurality of sensor pixels, and calculate the energy states, and calculate the change of energy states of the at least two adjacent sensor pixels within the period of the sampling time; wherein there are two types of energy states represented by binary characteristic values, and the change of the energy states shows a transition of a movement of the light tracing apparatus, wherein, the sensor array and the controller are integrated into a semiconductor circuit; the light source, the sensor array, and the controller are packaged into a circuit board of the light tracing apparatus.

8. The apparatus according to claim 7, wherein the light source generates the light with good spatial coherence.

9. The apparatus according to claim 8, wherein the light source is a laser device, and the light tracing apparatus is an optical indexer.

* * * * *